United States Patent Office 3,044,547
Patented July 17, 1962

---

3,044,547
PERMEABLE WELL CEMENT AND METHOD OF PROVIDING PERMEABLE CEMENT FILTERS IN WELLS
Ralph R. Jarboe, Jr., Tulsa, Okla., assignor to Cities Service Research and Development Company, New York, N.Y., a corporation of New Jersey
No Drawing. Filed Oct. 23, 1958, Ser. No. 769,102
16 Claims. (Cl. 166—12)

This invention relates in general to a permeable-type cement and, more particularly, to the use of such in forming a screening media for unconsolidated producing horizons of oil and gas wells so that particles from the incompetent formation will be effectively screened and the migration of sand into the well bore and production tubing will be prevented. Particle migration leads to a multitude of problems, such as the collapsing or sloughing of the well bore wall, plugging of the well bore, damage to pumping equipment and producing strings. While unconsolidated sands are found in numerous oil and gas producing areas, the most predominant areas are along the off-shore and coastal marsh regions of the United States, where production is from the more recent sediments, such as the miocene formation.

Several approaches have been made in an attempt to exclude sand from such producing wells. One method presently used is the so-called gravel-packing technique, in which gravel is positioned in the bore hole adjacent to producing formations with a fluid pressure. By applying pressure and reciprocating the drill pipe, gravel is forced through the perforations against the sand face and into the fractures. A more recently adopted technique involves the use of crushed walnut shells, which are coated with an unset plastic and injected into the producing zone by means of a carrying fluid. The plastic is allowed to set with the crushed walnut shells consolidating into a permeable filter screen.

While the foregoing methods and others have been used with some success, they have not been completely satisfactory in that sand migration still occurs with plugging generally resulting. Moreover, the application of these techniques is rather expensive and time-consuming. The ideal solution would be the utilization of a pumpable, permeable cement which would perform the function of ordinary well cement in supporting casing and simultaneously act as a filtering media so that the migration of sand particles to the producing well bore does not occur. Prior patent art such as U.S. 2,187,895; U.S. 2,240,622; U.S. 2,288,557; and U.S. 2,815,815 teach the preparation and utilization of various types of permeable cement compositions. In cement compositions prepared according to the foregoing teachings, rather high permeabilities are disclosed, however, the pore dimensions of these cements generally exceed the average sand particle size of the smaller ten percentile fraction and are therefore not effective as filters for these particles. This apparently explains the industry's failure to adopt proposed permeable cement compositions for use in highly unconsolidated sand-producing zones.

It is in this latter area of filterability that the present invention provides a substantial improvement over prior permeability cements in being able to effectively filter and prevent migration of the extremely small sand particles which according to prior techniques have not been controllable.

It is accordingly an object of the present invention to provide a new and improved permeable cement composition.

It is another object of the present invention to provide a new well completion cement which is readily pumpable and which has permeability and pore geometry characteristics not heretofore available in commercial well completion cements.

It is a further object of the present invention to provide an improved permeable cement composition of improved filtration characteristics superior to those of existing permeable cements.

These and other objects are accomplished according to the method and improved permeable cement compositions of the present invention which comprises in its broadest aspect a cement having admixed therewith a fibrous material and a solid organic compound possessing particular characteristics and properties. This new composition may be defined as one in which the cement comprises from about 70 to 95 parts by weight, the fibrous material from 1 to 10 parts by weight, and the solid organic compound from 4 to 20 parts by weight. While the ratio of the organic compound and fibrous material may vary in their total relation to the cement component of the composition within the range specified, it is necessary that the solid organic compound and the fibrous material be used in a parts ratio of from about 4:1 to 1:1, and preferably in a ratio of about 2:1, i.e., two parts of the organic compound to one part of the fibrous material. An example of a cement composition prepared according to the present invention having the desired permeability and pore characteristics is as follows:

| | Parts |
|---|---|
| Portland cement | 85 |
| Fiber asbestos (⅜-inch length) | 5 |
| Flake camphor (M.P. 354° F.) ($C_{10}H_{16}O$) | 10 |

When using a composition of the type defined above, it is necessary to prepare a slurry by mixing the cement composition with water. When utilized in the weight amounts specified, the addition to the foregoing composition of 12–17 gallons of water for 100 lbs. of the cement composition will provide a pumpable slurry of approximately 8 to 15 poises having a permeability of about 200 millidarcies when set at a pressure of 3000 p.s.i. In the general description above, the cement has been referred to as Portland cement, as this has been found to be an excellent material for the purpose desired. Other cements may be used, such as the commercially available latex cement and the high-temperature pozzolan and lime cement. Portland cement is preferred, since it has been found by experience that the pozzolan-type cements (pozzolan and Portland), in combination with the fibrous material and the organic compound, do not provide the desired permeability. This is apparently due to the lower permeability characteristics of these type cements and the reaction of pozzolan and precipitated lime to lower the effective porosity.

The fibrous material used in the present invention should be of a strong durable type varying in length from about ⅛ to ½ inch. Such fibers should be preferably water sensitive, i.e., hydrophilic, and increase in volume on wetting. The most satisfactory fiber of this type is asbestos. Other satisfactory fibrous material includes Dacron, a DuPont Corporation polyester fiber; Orlon, a DuPont Corporation acrylic fiber; and fiberglass. Other fibers of a generally similar type have been used, but the resulting cement has been deficient in one characteristic or another, thus making them unsuitable in the present invention. When utilizing asbestos as the fibrous material, it has been found that fiber lengths of from ¼ to ½ inch are most satisfactory.

The organic compound admixed with the fibrous material and cement should be insoluble in water, easily soluble in petroleum hydrocarbons and possess a melting point higher than the bottom hole temperature of the well in which setting of the cement will occur. Generally speaking, the latter requirement will be satisfied by utilizing a compound having a melting point above 250° F. If bottom hole temperatures are not of this order, then lower melting organic compounds may be used. Particularly suitable for the purpose of this invention are the polynuclear compounds such as naphthalene, b-naphthol and phenyl-phenol. Alicyclic and terpene type compounds such as camphor ($C_{10}H_{16}O$) and pinene hydrochloride ($C_{10}H_8HCl$) may also be conveniently used. When preparing a slurry the organic compound in a ground or pulverized state will be admixed with the dry cement prior to the addition of water.

As indicated a preferred composition is formulated with approximately 85 parts of Portland cement, 10 parts of the organic compound and 5 parts of the fibrous material. The combined amount of the organic compound and fiber material present in the final composition should not amount to more than about 25 parts of the total composition. If larger amounts of the combined organic compound and fibrous material are used the viscosity of the final product will exceed the maximum pumping viscosity for conventional injection equipment.

The importance of maintaining the proper ratio between the organic compound and the fibrous material will be more readily apparent by referring to Table I below

TABLE I

| Portland Cement, parts | Camphor/Asbestos ¼" | Air Permeability md. |
|---|---|---|
| 90 | 10 parts at 1:1 | 90 |
| 90 | 10 parts at 2:1 | 120 |
| 90 | 10 parts at 3:1 | 108 |
| 90 | 10 parts at 4:1 | 50 |
| 85 | 15 parts at 1:1 | 160 |
| 85 | 15 parts at 2:1 | 200 |
| 85 | 15 parts at 3:1 | 180 |
| 85 | 15 parts at 4:1 | 90 |
| 80 | 20 parts at 1:1 | 260 |
| 80 | 20 parts at 2:1 | 325 |
| 80 | 20 parts at 3:1 | 285 |
| 80 | 20 parts at 4:1 | 135 |

In the table above data is provided on the permeability of cement compositions prepared in the parts ratios set forth. It will be noted that in each instance when the organic compound-fibrous material ratio was maintained at 2:1 a higher permeability for the final composition was obtained. The cement prepared with 80 parts Portland cement and 20 parts combined camphor-asbestos shows superior permeability characteristics. However, compositions so prepared have viscosities bordering on the upper pumping limit and are therefore not preferred.

To more clearly define the effective compositions of the present invention suitable for screening of sand formations and filtering of the same, a series of cement compositions was prepared and tested. These compositions are shown in Table II which follows very satisfactory permeability was obtained with compositions 1, 3 and 9, whereas in compositions 6, 7 and 8 less satisfactory results were obtained. The permeability data provided was obtained after solvent extraction with kerosene according to the following Darcy formula for linear steady state flow:

$$k(\text{in Darcy units}) = \frac{uQL}{At(P_1 - P_2)}$$

wherein: $u$=viscosity of fluid in centipoises, $L$=length of test specimen in cm., $Q$=cc. of fluid passed in time $t$, $t$=time of flow expressed in seconds, $A$=area of cross-section of test specimen in square cm., and $(P_1 - P_2)$= pressure drop in $a$ atmospheres through the specimen. Permeability measurements were carried out on plugs prepared of the cement compositions defined herein. The plugs were prepared with ¾ inch diameter and a 1 inch length. The plug is placed in a holder and a constant fluid pressure applied. The volume of efflux of the driven fluid is determined. With the viscosity known, substitution in the fore-going Darcy formula provides the permeability in Darcy units (multiplying by 1,000 gives a millidarcy value).

One of the important features of the present invention is the excellent filter characteristics provided by the comparatively small average pore diameter obtained in the final composition. The average diameter in the pores of the set cement prepared with the composition defined above will be in the range of from 5 to 10 microns and more nearly averages 7 microns. This value is far less than pore dimensions obtained for equivalent cements taught in the prior art having much higher permeability characteristics. For example, cements having permeability of 4.5 darcies would have average pore diameters of about 42 microns, while cements with reported permeabilities in the range of 10 darcies have pore diameters upwards of 200 microns. Sieve analysis of unconsolidated sand formations such as the miocene producing sands of the Gulf Coast area indicate a high percentage of particle size in the minus 44 micron range. In order to demonstrate the superior filter characteristics of the improved cement of the present invention in limiting sand plugging of producing wells, a series of radial flow tests was conducted. The test consisted of preparing a permeable cement with the composition shown for compound 1 in Table II. After setting, a core was mounted between impervious end plates and a hole drilled in the center of the core to simulate a producing well. The core was then extracted with a kerosene solvent to remove the organic solid. The core was then immersed in a vessel containing an unconsolidated sand which contained a 10% fraction of 1–9 micron fly ash. This sand was saturated with SAE 20 material. A vacuum was then pulled on the core through the center hole (well) causing flow of the oil through the core. After 21 days of flow no fines were found in the produced oil. Destructive analysis of the cement and microscopic examination showed that no fines

TABLE II

*Permeabilities of Various Permeable Cement Mixes*

| Comp. | Cement | Additive Organic | Additive Fiber | Permeability (after solvent extraction), md. |
|---|---|---|---|---|
| 1 | Portland | Camphor | Asbestos ¼" | 201 |
| 2 | Latex | do | do | 128 |
| 3 | Portland | Naphthalene | do | 292 |
| 4 | High Temp. (85 parts Pozzolan, 15 parts Ca (OH)₂) | Camphor | do | 143 |
| 5 | Portland | do | Fiberglass ¼" | 156 |
| 6 | do | do | Cotton ¼" | 35 |
| 7 | Pozmix (50 parts Pozzolan, 50 parts Portland) | do | Asbestos ⅜" | 48 |
| 8 | Portland, 95 parts | None | do | 82 |
| 9 | Portland | b-naphthol | do | 306 |
| 10 | do | p,phenyl-phenol | do | 152 |

In the foregoing table the cements were prepared in the following proportion: 85 parts cement, 10 parts organic additive, 5 parts fiber additive. Curing conditions were 3000 p.s.i. at 200° F. for 24 hours. It will be noted that had penetrated the cement. Initial oil permeability was 205 millidarcies with final oil permeability of the core being measured as 209 millidarcies. The slight rise in permeability noted is believed due to the more complete removal of the organic camphor present in the cement.

The importance of utilizing both the organic compound and the fibrous material in the proportions specified is demonstrated in Table III.

TABLE III

| Batch | Slurry Composition, Percent by weight | | | Comment | Air Permeability, millidarcies |
|---|---|---|---|---|---|
| | Portland | Camphor | Asbestos | | |
| 1 | 90 | 10 | 0 | (No fiber) | 0.3 |
| 2 | 95 | 0 | 5 | (No camphor) | 82.5 |
| 3 | 85 | 10 | 5 | (Combined or standard additive.) | 201 |

It will be noted in the foregoing table that compositions 1 and 2 wherein one or the other of the camphor asbestos additive was removed produced comparatively low permeability. On the other hand, batch 3 representing the standard composition provided a very satisfactory permeability of 201 millidarcies.

As has been previously indicated the compositions of the present invention in addition to having superior filtering properties and very satisfactory permeability characteristics possess strengths clearly within the American Petroleum Institute requirements for class D and F cement which are used for supporting pipe in 12,000 and 16,000 foot holes. This is more clearly shown in TABLE IV which follows:

TABLE IV

*Strength Properties* [1]

| Time | Compressive Strength (after solvent extraction), p.s.i. |
|---|---|
| 1 day (water cured) | 625 |
| 2 days (water cured) | [2] 750 |
| 4 days (water cured) | 900 |
| 7 days (water cured) | 1,050 |
| 21 days (water cured) | 1,340 |

[1] Cement composition, 85 parts Portland, 10 parts camphor, and 5 parts ⅜" asbestos.
[2] API Class D and F cements require a minimum of 750 p.s.i. compressive strength on set.

While the cement of the present invention is not primarily intended for well cementing in accordance with conventional practice where pipe or casing support is required, the composition of the present invention has more than the necessary strength to accomplish this purpose. This added feature contributes considerably to the practical nature of the improved cement of this invention.

In preparation for well bore placement of the permeable cement slurry, the cement, fiber, and organic additive may be dry mixed. This mixture can then be put in slurry form by adding water by means of conventional continuous jet-hopper pumping apparatus.

The slurry can also be prepared by suspending the fiber material in the mixing water prior to the addition of the cement and organic compound. When batch mixing in this manner, it has been found that the addition of a foaming agent to the mixing water evens fiber distribution and provides a more uniform slurry. The foaming agent, which may be hydrogen peroxide or calcium lignosulphonate, is added in an amount from 0.025 to 0.1% by weight of foaming agent in the cement used in forming the slurry. The addition of such a weight provides a more balanced distribution of components and the cement on setting has a more even pore distribution with no adverse effect on final cement strength.

Downhole placement of the permeable cement slurry can be achieved as in a normal primary well cementing job, i.e., down the casing and up the annulus between the casing and bore hole. It can also be satisfactorily squeezed through perforated casing to fill the void existing between the casing and the unconsolidated formation. The slurry can also be used to fill up across the unconsolidated zone in an open hole or uncased interval, with after set drill-out again defining the bore hole. Numerous other placement methods are possible, such as the placement behind a slotted or screened well liner and the placement of a surface prepared system consisting of two concentric slotted liners with the permeable cement media within the annulus existing between the outer and inner liner. After sufficient time has been allowed for the cement to set, the cement is drilled out, if needed to redefine the bore hole, and washed with a solvent such as kerosene or the like to remove the solid organic compound so as to establish the effective porosity of the permeable cement. Any suitable solvent can be used to extract the solid organic compound. If sufficient pressure exists in the formation, the organic compound may be removed by the produced oil in the formation. After sufficient solvent effect is obtained, either by introduction of solvent or by natural existing solvent forces, the well may be flowed or placed on pump in a conventional manner.

While this invention has been described with some particularity, it is to be understood that the invention is limited only by the claims appended hereto.

I claim:

1. A pumpable cement slurry for use in forming a permeable cement filter in a well and comprising from 70 to 95 parts by weight of Portland cement, from 1 to 10 parts by weight of asbestos having a fiber length of from ⅛ to ½ in., from 4 to 20 parts by weight of a water insoluble solid organic compound that is soluble in hydrocarbon solvents and has a melting point higher than the bottom hole well temperature and sufficient water to make the slurry pumpable.

2. A pumpable cement slurry for use in forming a permeable cement filter in a well and comprising about 85 parts by weight of Portland cement, from 1 to 10 parts by weight of an asbestos fiber having fiber lengths in the range of from ⅛ to ½ in., from 4 to 20 parts by weight of a water insoluble solid organic compound that is soluble in light hydrocarbons and has a melting point higher than the bottom hole well temperature and sufficient water to make the slurry pumpable.

3. A pumpable cement slurry for use in forming a permeable cement filter in a well and comprising about 85 parts by weight of Portland cement, 5 parts by weight of an asbestos filler having fiber lengths in the range of from ⅛ to ½ in., 10 parts by weight of a water insoluble solid organic compound that is soluble in light hydrocarbons and has a melting point higher than the bottom hole well temperature and sufficient water to make the slurry pumpable.

4. The composition as claimed in claim 1, wherein the solid organic compound is camphor.

5. The composition as claimed in claim 1, wherein the solid organic compound is napthalene.

6. The composition as claimed in claim 1, wherein the solid organic compound is b-naphthol.

7. The composition as claimed in claim 1, wherein the solid organic compound is p-phenyl phenol.

8. The composition as claimed in claim 1, wherein the solid organic compound is pinene hydrochloride.

9. A method of providing a permeable cement filter in oil and gas wells which comprises introducing into the producing region of a well a cement slurry comprising from 70 to 95 parts by weight of Portland cement, 1 to 10 parts by weight of asbestos having a fiber length of from ⅛ to ½ in., from 4 to 20 parts by weight of a water insoluble solid organic compound, soluble in hydrocarbon solvents, having a melting point higher than the bottom hole temperature of the well, and sufficient water to make a pumpable slurry, permitting the slurry to set adjacent to the producing region of the well, drilling out a portion of the set cement below the end of the well casing and washing the set cement with a hydrocarbon solvent to thereby extract the solid organic compound from the set cement.

10. A method of providing a permeable cement filter in oil and gas wells which comprises introducing into the producing region of a well a cement slurry comprising from 70 to 95 parts by weight of Portland cement, 1 to 10 parts by weight of asbestos having a fiber length of from 1/8 to 1/2 in., from 4 to 20 parts by weight of a water insoluble solid organic compound, soluble in hydrocarbon solvents, having a melting point higher than the bottom hole temperature of the well, and sufficient water to make a pumpable slurry, permitting the slurry to set adjacent to the unconsolidated producing region of the well, drilling out a portion of the set cement to redefine the bore hole if necessary and washing the set cement with kerosene to thereby extract the solid organic compound.

11. A method of providing a permeable cement filter, in oil and gas wells, having average pore diameters in the range of from 5 to 10 microns which comprises introducing into the producing zone of a filter well a cement slurry comprising about 85 parts by weight of Portland cement, 5 parts by weight of asbestos having a fiber length of from 1/8 to 1/2 in., 10 parts by weight of a water insoluble granulated solid organic compound which is soluble in hydrocarbon solvents and has a melting point higher than the bottom hole temperature of the well and sufficient water to make the slurry pumpable, permitting the slurry to set adjacent to the producing zone of the well, drilling out a portion of the set cement when needed to redefine the bore hole and washing the set cement with a hydrocarbon solvent to thereby extract the solid organic compound.

12. A method of providing a permeable cement filter in oil and gas wells as claimed in claim 10, wherein the solid organic compound is camphor.

13. A method of providing a permeable cement filter in oil and gas wells as claimed in claim 10, wherein the solid organic compound is napthalene.

14. A method of providing a permeable cement filter in oil and gas wells as claimed in claim 10, wherein the solid organic compound is b-naphthol.

15. A method of providing a permeable cement filter in oil and gas wells as claimed in claim 10, wherein the solid organic compound is a phenyl phenol.

16. A method of providing a permeable cement filter in oil and gas wells as claimed in claim 10, wherein the solid organic compound is pinene hydrochloride.

References Cited in the file of this patent

UNITED STATES PATENTS

| | | |
|---|---|---|
| 2,044,204 | Brice | June 16, 1936 |
| 2,156,310 | Schuh | May 2, 1939 |
| 2,240,622 | Lawson | May 6, 1941 |
| 2,288,557 | Vollmer | June 30, 1942 |
| 2,514,021 | Abraham | July 4, 1950 |
| 2,674,323 | Cardwell | Apr. 6, 1954 |
| 2,763,561 | Burney et al. | Sept. 18, 1956 |